United States Patent [19]
Karol et al.

[11] 4,086,409
[45] Apr. 25, 1978

[54] ETHYLENE POLYMERIZATION WITH SILOXANE MODIFIED CATALYST

[75] Inventors: Frederick John Karol, Bellemead, N.J.; Chi-Sung Wu, Beaconsfield, Canada

[73] Assignee: Union Carbide Corporation, New York, N.Y.

[21] Appl. No.: 687,944

[22] Filed: May 19, 1976

Related U.S. Application Data

[60] Division of Ser. No. 426,559, Dec. 20, 1973, which is a continuation-in-part of Ser. No. 156,187, Jun. 24, 1971, abandoned.

[51] Int. Cl.$^2$ .......................... C08F 4/02; C08F 10/02
[52] U.S. Cl. ................................. 526/130; 252/428; 252/430; 526/96; 526/126; 526/135; 526/348; 526/352
[58] Field of Search ................. 252/428, 430; 526/96, 526/126, 130

[56] References Cited

U.S. PATENT DOCUMENTS

| | | | |
|---|---|---|---|
| 3,285,891 | 11/1966 | Aftandilian | 526/352 |
| 3,709,853 | 1/1973 | Karapinka | 526/96 |

*Primary Examiner*—Edward J. Smith
*Attorney, Agent, or Firm*—James J. O'Connell

[57] ABSTRACT

Supported bis-cyclopentadienyl chromium [II] catalysts are modified with compounds having in their structure the moiety

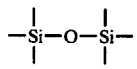

in order to improve the toughness and impact strength of the resulting ethylene polymers made therewith.

25 Claims, 1 Drawing Figure

U.S. Patent  April 25, 1978  4,086,409
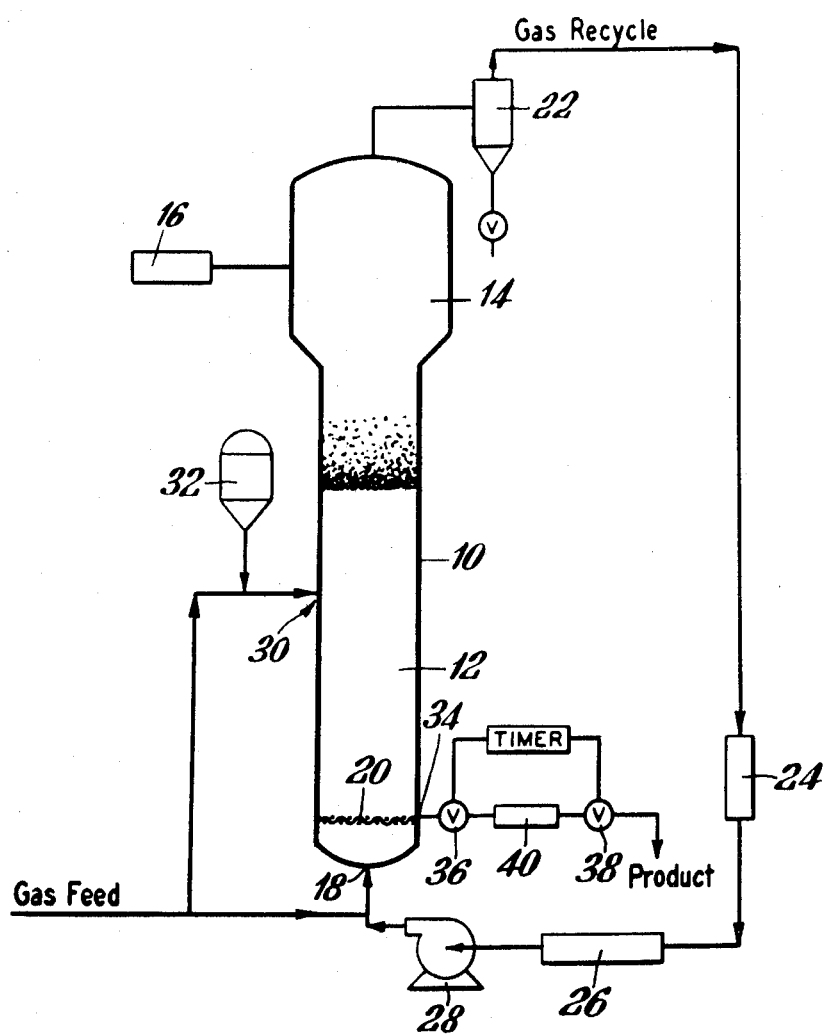

ETHYLENE POLYMERIZATION WITH SILOXANE MODIFIED CATALYST

CROSS-REFERENCE TO RELATED PATENT APPLICATIONS

This patent application is a division of application Ser. No. 426,559 filed Dec. 20, 1973 which was a continuation-in-part of application Ser. No. 156,187 filed June 24, 1971 which disclosed and claimed subject matter which was first disclosed and claimed in United States patent application Ser. No. 075,456, filed Sept. 25, 1970. Said application Ser. Nos. 156,187 and 075,457 are now abandoned.

BACKGROUND OF THE INVENTION

1. Field of the Invention

The invention relates to the catalytic polymerization of ethylene, alone, or with other α-olefin monomers.

2. Definitions

Various of the properties of the polymers discussed herein were determined by the following procedures or test methods:

Density: ASTM D-1505 — Plaque is conditioned for 1 hour at 120° C. to approach equilibrium crystallinity.

Melt Index (MI): ASTM D-1238 — Measured at 190° C. reported as grams per 10 minutes.

Flow Index (HLMI): ASTM D-1238 — Measured at 10 times the weight used in the melt index test above.

Flow Rate Ratio (FRR) = Flow Index/Melt Index

The flow rate ratio is a relative measure of the molecular weight distribution of a resin and is simply the ratio of the flow index value to the melt index value (440 psi melt index to the 44 psi melt index). This relationship between the flow rate ratio and molecular weight distribution is based on the phenomenon that polymers having a more narrow molecular weight distribution are more newtonian in melt flow behavior and thus have flows which are less sensitive to shear. Thus, polymers having a more narrow molecular weight distribution have a lower flow rate ratio.

Impact Strength

The impact strength of a resin is determined by injection molding the resin into the shape of a dishpan measuring 7 × 9 × 5 inches and allowing the test specimens to age for 24 hours at room temperature. Five to seven molded samples of each resin are then broken by dropping a weight on the bottom of the inverted dishpans at increasing heights until the specimens break. The impact value is reported in foot pounds as the product of the height in feet (at which breakage occurs) and the weight in pounds. As an example, if five specimens break at 6, 6, 7, 8 and 8 feet using a 2-pound weight, the reported impact strength value would be 14 foot pounds calculated as follows:

$$6 + 6 + 7 + 8 + 8/5 \times 2 = 14 \text{ foot pounds}$$

DESCRIPTION OF THE PRIOR ART

U.S. Pat. No. 3,709,853 discloses the use of an inorganic oxide supported bis-cyclopentadienyl chromium [II] compound as a catalyst for the polymerization of ethylene, alone, or with other α-olefins.

Although the polymers produced by use of these catalysts have relatively high molecular weights, these polymers tend to have a relatively narrow molecular weight distribution as evidenced by the fact that their flow rate ratio values are relatively low, that is, of the order of about 31 to 55. As a result, these polymers tend to have impact strength values of the order of about 2 to 17 foot pounds at a melt index level of 10 to 17. The impact strength test values are used to evaluate the toughness of the polymer. Toughness of such olefin polymers is a desired property of applications such as household articles, containers, toys and industrial tote boxes. In order to improve, and expand on, the utility of ethylene polymers made with the bis-cyclopentadienyl chromium [II] compound catalysts, therefore, it has been found necessary to attempt to devise ways by which the toughness of polymers made with such catalysts could be improved, at such melt index levels, or to devise ways to retain the existing toughness at higher melt index levels, while at the same time avoiding any catalyst modifications that would have an adverse effect upon the productivity of the modified catalyst. Depending on the application an improvement in toughness may be exploited in one of two ways. If the existing product is tough enough then it is desirable to make the improved product at a higher melt index while retaining the same toughness. This gives the advantage of easier molding and results in increased production, which is an obvious economic advantage. On the other hand, the improved toughness may be used as a means for allowing the improved polymer to be used in new applications where, without the benefit of this invention, the toughness of the finished article would not be of sufficient toughness at a given level of melt index.

SUMMARY OF THE INVENTION

It has now been found that the toughness of ethylene polymers made by the use of supported bis-cyclopentadienyl chromium [II] catalysts in the polymerization of ethylene, alone, or with other α-olefin monomers may be substantially improved, without producing any adverse effects on the productivity of the catalyst, if the catalyst is modified by the use therewith of an oxygen containing compound, other than the support, having in its structure at least one moiety of the formula

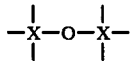

wherein the X's are the same or different, and are C and Si.

An object of the present invention is to provide a means for improving the toughness of ethylene polymers prepared with supported bis-cyclopentadienyl chromium [II] catalysts without deleteriously effecting the productivity of such catalyst systems.

BRIEF DESCRIPTION OF THE DRAWINGS

The drawing shows a fluid bed reaction system in which the composite catalysts of the present invention may be used.

DESCRIPTION OF THE PREFERRED EMBODIMENT

In accordance with the teachings of the present invention about 0.01 to 20 mols, and preferably about 0.05 to 12 mols, of the oxygen containing compound, or catalyst modifier, are used per mol of bis-cyclopentadienyl chromium [II] compound in the composite catalysts of the present invention.

The oxygen containing catalyst modifiers may be inorganic or organic in nature. By organic it is meant that the compound contains at least one carbon atom containing radical.

The oxygen containing compounds of the present invention would include ethers, i.e., those having the moiety

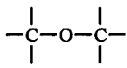

in their structure. The ethers which may be used in the present invention would include compounds containing one or more oxygen atoms and 2 to 100 or more carbon atoms, such as alicyclic monoethers such as tetrahydrofuran, furan, 2-methyltetrahydrofuran, tetrahydropyran, and vicinal epoxides such as ethylene and propylene oxide; aliphatic monoethers such as dimethyl ether, diethyl ether, di-n-propyl and di-isopropyl ether and di-n-butyl ether; monoethers containing at least one phenyl ring such as diphenyl ether, and di-alpha methyl benzyl ether; and polyethers such as p-dioxane, 1,2-dimethoxyethane, 1,3-dioxolane, dimethoxy methane, and polymeric compounds of the structure $-[O-R]_n-$ wherein $n$ is a whole number of 2 or more and R is a $C_1$ to about $C_{10}$ substituted or unsubstituted hydrocarbon radical. Such polymeric compounds would include polymethylene oxide, polyethylene oxide and polybutylene oxide.

The oxygen containing compounds of the present invention which contain silicon atoms would include compounds containing one or more oxygen atoms and from 0 up to about 100 or more carbon atoms and 1 up to about 10 or more silicon atoms, such as alkoxy and aryloxy derivatives of silane ($SiH_4$) such as trimethyl ethoxy silane; triethyl ethoxy silane; and trimethyl phenoxy silane.

The silicon atom containing compounds would also include:

a. organo disiloxane compounds such as those of the formula $[(Ro)_3Si]_2O$ wherein the $R_o$'s are the same or different and are H and at least one $C_1$ to about $C_{10}$ substituted or unsubstituted hydrocarbon radical such as methyl, ethyl, propyl, phenyl and benzyl. These compounds would include hexamethyl disiloxane and hexaethyl disiloxane.

b. cyclic organosiloxane compounds such as those having the structure $[R'R''SiO]_m$ wherein $m$ is a whole number of 3 to about 10, R' is a $C_1$ to about $C_{10}$ substituted or unsubstituted hydrocarbon radicaL such as methyl, ethyl, propyl, phenyl and benzyl, and R" is R' or H. These compounds would include tetramethylcyclotetra siloxane ($CH_3HSiO)_4$; hexamethyl cyclotrisiloxane and octamethyl cyclotetrasiloxane.

c. linear polyorganosiloxanes, such as the silicone oils, i.e., materials which are liquid at 25° C. and have the structure

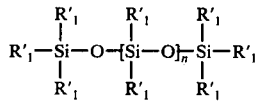

wherein $n$ is a whole number of 1 or more, and the $R'_1$ groups are the same or different and are $C_1$ to about $C_{10}$ substituted or unsubstituted hydrocarbon radicals such as methyl, ethyl, propyl, and phenyl. These oils would thus include dimethyl silicone oils (wherein $R'_1$ is all $CH_3$) and methyl phenyl silicone oils (wherein some $R'_1$ radicals are $CH_3$ and some are $C_6H_5$).

The silicon containing catalyst modifiers may also include inorganic compounds or polymers which do not contain carbon such as compounds of the formula $H_3Si-[OSiH_2-]_zOSiH_3$ wherein $z$ is an integer of 0 to about 6; such as linear or cyclic polysiloxanes such as disiloxane ($H_3SiOSiH_3$), trisiloxane ($H_3SiOSiH_2OSiH_3$), cyclotetrasiloxane and cyclopentasiloxane.

The catalyst modifier may contain, as noted above, one or more substituted or unsubstituted hydrocarbon radicals. The substituents, when present, on such radicals must be inert to the other components of the composite catalyst systems of the present invention, and to the other components of the polymerization systems in which the catalysts are used, such as the olefin monomers, solvents and hydrogen. The catalyst modifier, therefore, should not contain functional groups which, to the extent that they might be present, would poison the polymerization reaction. Functional groups to be avoided in this regard include active hydrogen containing groups such as OH, SH, $NH_2$ and COOH; and halogen radicals. The modifiers also should not contain substituents which, to the extent that they might be present, would react with one or more of the other components of the reaction system and thereby generate catalyst poisons in situ in the polymerization reaction system. Thus, although monoalkoxy- or monoaryloxy silanes may be readily used as catalyst modifiers in accordance with the teachings of the present invention, it is believed that the use of tetraalkoxy-, tetraaryloxy-, trialkoxy- and tri-aryloxy silanes, or large amounts of dialkoxy- or di-aryloxy silanes, could lead to the in situ generation of intolerable amounts of alcoholic poisons as a result of the possible interaction of such polysubstituted silane compounds with hydroxyl groups on the inorganic oxide supports used in the composite catalyst systems of the present invention.

Although the exact mechanism by which the modifier functions is not known with certitude, it is believed that the catalyst modifier may form a complex at active sites of the supported catalyst in its role as a catalyst modifier. For this reason the catalyst modifier should have a molecule size small enough to permit it to reach such active sites of the supported catalyst.

The preferred catalyst modifiers are those which contain 1 to about 5 carbon atoms. It is also preferable for the catalyst modifier to be soluble in an aliphatic or aromatic hydrocarbon solvent so that the desired modification of the catalyst can be facilitated by treating the catalyst with a solution of the modifier in one or more of such solvents.

The catalyst modifiers may be used individually, or in combination with one another.

Inorganic Oxide Supported Bis(cyclopentadienyl)chromium [II]

The catalyst species comprises an organo-metallic bis-cyclopentadienyl chromium [II] compound deposited on an inorganic oxide support.

About 0.001 to 10%, or more, by weight of the organometallic compound is used on the support, based on the combined weight of the organometallic compound and the inorganic oxide support. The amount of the organometallic compound which can be deposited on the support varies, depending on the particular support being used, and the activation or dehydration temperature of such support. Typically about one fourth to one half of the amount of the organometallic compound that could be deposited on the support is used to facilitate introducing the compound into the reactors, but the extremes in amounts of from near zero to total saturation of the support have been used without effect on final polymer properties.

The bis(cyclopentadienyl)chromium [II] compound has the structure

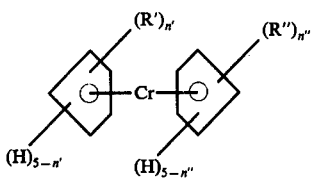

wherein R' and R" may be the same or different $C_1$ to $C_{20}$, inclusive, hydrocarbon radicals, and n' and n" may be the same or different integers of 0 to 5, inclusive. The R' and R" hydrocarbon radicals may be saturated or unsaturated, they may include aliphatic, alicyclic and aromatic radicals such as methyl, ethyl, propyl, butyl, pentyl, cyclopentyl, cyclohexyl, allyl, phenyl and naphthyl radicals.

The bis(cyclopentadienyl)chromium [II] compounds which may be used as catalysts on the inorganic oxide supports in accordance with the present invention may be prepared as disclosed in U.S. Pat. Nos. 2,870,183 and 3,071,605.

The inorganic oxide materials which may be used as a support for the organometallic compounds are materials having a high surface area, that is, a surface area in the range of about 50 to about 1000 square meters per gram. The inorganic oxides which may be used include silica, alumina, thoria, zirconia and other comparable inorganic oxides, as well as mixtures of such oxides.

Because bis(cyclopentadienyl)chromium [II] is sensitive to moisture, the catalyst support should be completely dried before it is brought into contact with the organochromium compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the absorbed water from the support while at the same time avoiding such heating as will remove all of the chemically bound water from the support. The passage of a stream of dry inert gas through the support during the drying aids in the displacement of the water from the support. Drying temperatures of from about 200° C. to 1000° C. for a short period of about 6 hours or so should be sufficient if a well dried inert gas is used, and the temperature is not permitted to get so high as to completely remove the chemically bound hydroxyl groups on the surface of the support.

Any grade of support can be used but micro-spheroidal intermediate density (MSID) silica having a surface area of 258 square meters per gram and a pore diameter of about 288 A, and intermediate density (ID) silica having the same area but a pore diameter of 164 A are preferred. Other grades such as the G-968 silica and G-966 silica-alumina, as designated by W. R. Grace and Co. having surface areas of 700 to 500 square meters per gram, respectively, and pore diameters of 50–70 A are also quite satisfactory. Variations in melt index control and in polymer productivity can be expected between different grades or types of supports.

The supported catalysts can be prepared by a slurry technique where the selected and properly dried support is added under conditions which exclude the presence of air and moisture to a solution containing the bis(cyclopentadienyl)chromium [II] and solvent to form a slurry. The slurry may be stirred for a period of up to about 4 hours to obtain good adsorption of the bis(cyclopentadienyl)chromium [II] on the support.

The supported catalyst can be used in slurry form or as a semi-solid paste or as a dry free flowing powder. To form the paste or dry powder, the solvent can be filtered, drained or evaporated from the slurry under conditions which exclude oxygen and moisture to yield the desired form of the catalyst.

The dry supported catalyst may also be conveniently prepared in the absence of solvent by direct vapor deposition (sublimation) of the selected bis(cyclopentadienyl)chromium [II] onto a dry support. This may be simply and conveniently accomplished by blending the bis(cyclopentadienyl)chromium [II] compound and support under a dry, inert atmosphere, and then reducing the pressure to cause the bis(cyclopentadienyl)chromium [II] to sublime and absorb onto the support.

Composite Catalysts

The composite catalysts of the present invention, as noted above, are prepared from the catalyst modifier and the above described inorganic oxide supported bis(cyclopentadienyl)chromium [II] compounds.

The composite catalyst comprises about 0.04 to 20 weight % of the catalyst modifier and about 99.96 to 80 weight % of the inorganic oxide supported bis(cyclopentadienyl)chromium [II] compound. About 0.01 to 20 mols, and preferably about 0.05 to 12 mols, of the catalyst modifier are used per mole of the organochromium compound.

The catalyst modifier component of the composite catalyst is usually added to the inorganic oxide supported bis(cyclopentadienyl)chromium [II] component of the catalyst system prior to the polymerization reaction. The two such components of the catalyst system, however, may also be separately added to the polymerization system. Where the catalyst modifier component is added to the inorganic oxide supported bis(cyclopentadienyl)chromium [II] compound, the modifier may be deposited from a suitable solvent or added directly to the reactor. Suitable solvents which may be used as vehicles for the deposition of the modifier on the inorganic oxide supported bis(cyclopentadienyl)chromium [II] compound include all the organic solvents listed below which may be used in the polymerization reactions. The solvents, of course, must be inert to the modifier.

When depositing the modifier on the support with a solution thereof, it is usually necessary to use a solution which contains an excess of the amount of modifier that one desires to deposit on the support, because of equilibrium (adsorption ⇌ solution) and other factors, such as the pore size of the support and the molecule size of the modifier. Where the modified catalyst is to be used in a solution or slurry polymerization reaction, quantities of the modifier in excess of those actually adsorbed on the supported catalyst can be present in the reaction system.

Care should be taken to avoid having moisture or air, which are catalyst poisons, contact the composite catalyst.

About 1.0 to 0.00001 weight % of the composite catalyst is used per mol of monomer being polymerized. The amount of catalyst being employed may vary depending on the type of polymerization procedure being employed and the amount of catalyst poisons in the system.

The Monomers

Ethylene may be polymerized alone, in accordance with the present invention, or it may be interpolymerized with one or more other alpha-olefins containing 3 to about 12, inclusive, carbon atoms. The other α-olefin monomers may be mono-olefins or di-olefins.

The mono-α-olefins which may be interpolymerized with ethylene would include propylene, butene-1, pentene-1, 3-methylbutene-1, hexene-1, 4-methyl-pentene-1, 3-ethyl-butene-1, heptene-1, octene-1, decene-1, 4,4-dimethylpentene-1, 4,4-diethyl hexene-1, 3,4-dimethylhexene-1, 4-butyl-1-octene, 5-ethyl-1-decene, 3,3-dimethylbutene-1, and the like. Among the diolefins which may be used are 1,5-hexadiene, dicyclopentadiene, ethylidene norbornene, and other non-conjugated diolefins.

The Polymers

The polymers which are prepared in accordance with the teachings of the present invention are solid materials which have densities of about 0.945 to 0.970, inclusive, and melt indexes of about 0.1 to 100 or more.

The preferred polymers are the homopolymers of ethylene. The interpolymers will contain at least 50 weight %, and preferably at least 80 weight %, of ethylene.

The Polymerization Reaction

After the composite catalysts have been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of the entire monomer charge, the particular composite catalyst being used and its concentration. The selected operating temperature is also dependent upon the desired polymer melt index since such temperature is also a factor in adjusting the molecular weight of the polymer. Preferably, the temperature is from about 30° C. to about 100° C. in the conventional slurry or "particle forming" process and from 100° C. to 200° C. in the "solution forming" process. The control of temperature in this process is desirable as hereinafter more fully described in providing various effects upon molecular weight of the polymers as well as in controlling the phase in which they are made. As with most catalyst systems, the use of higher polymerization temperatures tends to produce lower weight average molecular weight polymers, and consequently polymers of higher melt index.

The pressure can be any pressure sufficient to initiate the polymerization of the monomer charge and can be from subatmospheric pressure, using an inert gas as a diluent, to superatmospheric pressure of up to about 1,000,000 psig (pounds per square inch gauge), or more, but the preferred pressure is from atmospheric up to about 1000 psig. As a general rule, a pressure of 20 to 800 psig is preferred.

When an inert organic solvent medium is employed in the process of this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isopentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, ortho-dichlorobenzene, and the like. Particularly preferred solvent media are cyclohexane, pentane, isopentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and its solution temperature of the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90° C., wherein in pentane its solution temperature may be about 110° C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperature, the monomer is more soluble in the solvent medium, thus counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than 50 percent solids content, provided conditions of sufficient agitation are maintained. It is particularly preferable to operate the slurry process in the range of 30-40 weight percent of polymer solids.

Recovery of the polymer from the solvent medium is, in this embodiment, reduced to a simple filtration and/or drying operation and no efforts need be expended in polymer clean up and catalyst separation or purification. The residual concentration of catalyst in the polymer is so small it can be left in the polymer.

Operating at temperatures higher than the solution temperature of the polymer in the selected solvent medium also can produce a high polymer solids content in a solution polymerization procedure. The temperature in this type of polymerization system must be sufficiently high to enable the solvent being used to dissolve at least 25-30 percent by weight of the polymer being produced. On the other hand, the temperature must be sufficiently low to avoid thermal destruction of the formed polymer and the particular catalyst employed. In general, for the various solvents and bis(cyclopentadienyl) chromium [II] catalyst used, temperatures within the range of about 100° C. to about 200° C. and preferably about 120° C. to about 170° C. have been found to be generally optimum for the practice of such solution polymerization procedure. However, the particular polymer being produced must also be taken into account in deciding on the optimum polymerization temperature to be used. For example, ethylene-propylene copolymers which may be produced by this process may be soluble in many of these organic solvents at relatively low temperatures, even though such temperatures may not be useful for the optimum production of ethylene homopolymers.

Solvents constitute one of the most significant and vexing sources of catalyst poisoning. Moreover, in most prior solution polymerization processes employing transition metal-containing catalysts, the use of large quantities of solvent, i.e., a solvent-to-polymer ratio of the order of 20:1, was believed necessary. Such large proportions of solvent, necessarily, greatly increased the catalyst poisoning problem. In the present process, however, the proportion of solvent to polymer can be as low as 0.1:1 or even less, thereby maintaining a very high catalyst productivity and efficiency of the system.

When the solvent serves as the principal reaction medium, it is of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

By conducting the polymerization reaction in the presence of hydrogen, which appears to function as a chain transfer agent, the molecular weight of the polymer may be further controlled.

Experience has shown that hydrogen may be used in the polymerization reaction in amounts varying between about 0.001 to about 10 moles of hydrogen per mole of olefin monomer. For most polymerization reactions, however, the entire molecular weight range may be obtained by using from about 0.001 to about 0.5 mole of hydrogen per mole of monomer.

The homo- or inter-polymerization of ethylene with the catalysts of this invention in a fluid bed reactor can be readily appreciated by reference to the following description and attached FIGURE which illustrates the schematic operation of a fluidized bed reactor which may be used in the practice of this invention.

Employing the catalysts of this invention there may be produced, under conditions hereinafter set forth for a fluid bed reactor, ethylene homopolymers and polymers formed by polymerizing ethylene with alpha olefins containing 3 to about 12 carbon atoms which are gaseous at the polymerization temperature and which can be polymerized with ethylene at a temperature below the sintering temperature of the resultant polymer to form dry particulate resin particles essentially free of low molecular weight polymers such as waxes and greases.

Random copolymers as well as specialty polymers can also be produced in the fluid bed reactor. For instance, different monomers may be sequentially introduced to a single fluidized bed to form block copolymers. Another expedient is to transfer resin from a reactor containing one monomer through a suitable valve into a reactor containing another monomer with negligable carry over of monomer from one reactor to another. This latter expedient may also be effectively used to form mixtures of polymers. Both alternatives are particularly useful in forming block copolymers and mixtures of polymers from monomers having different reactivity properties.

The composite supported catalysts are used in the form of a concentrated slurry of particles or a powdery free flowing solid particles as hereinbefore described. The supported catalysts are preferably capable of subdivision, which is the ability of the catalyst particles to rupture in the presence of a growing polymer and thereby extend itself to form many particles having a low catalyst residue from a single catalyst particle.

The subdividable supported catalysts for the fluid bed reactor may be prepared, for instance, by depositing the modified bis(cyclopentadienyl)chromium [II] on a porous carrier of high surface area. When incorporated in a porous support of high surface area, the catalyst forms active sites on the surface and in the pores of the support. Although the actual mechanism of the process is not entirely understood, it is believed that the polymers begin to grow at the surface as well as in the pores of the supported catalyst. When a pore grown polymer becomes large enough, it ruptures the support thereby exposing fresh catalyst sites in the inner pores of the support. The supported catalyst may thus subdivide many times during its lifetime in the bed and thereby enhance the production of low catalyst residue polymers, thereby eliminating the need for recovering the catalyst from the polymer particles. If the support is too large, it may resist rupture thereby preventing subdivision which would result in catalyst waste. In addition, a large support may act as a heat sink and cause "hot spots" to form.

A fluidized bed reaction system which may be used in the practice of this invention is illustrated in the FIG- URE. With reference thereto the reactor 10 consists of a reaction zone 12 and a velocity reduction zone 14.

The reaction zone 12 comprises a bed of growing polymer particles, formed polymer particles and a minor amount of catalyst fluidized by the continuous flow of polymerizable and modifying gaseous components in the form of make-up feed and recycle gas through the reaction zone. To maintain a viable fluidized bed, mass gas flow through the bed must be above the minimum flow required for fluidization, preferably from about 2 to about 6 times $G_{mf}$ and more preferably from about 3 to about 5 $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the powdery catalyst throughout the reaction zone. On start up, the reaction zone is usually charged with a base of particulate polymer particles before gas flow in initiated. Such particles may be identical in nature to the polymer to be formed or different therefrom. When different, they are withdrawn when the desired formed polymer particles as the first product. Eventually, a fluidized bed of the desired particles supplants the start-up bed.

The catalyst concentration in the fluidized bed is substantially equal to the catalyst concentration in the product, namely in the order of about 0.0003 to about 0.50 percent of bed volume.

The catalyst used in the fluidized bed is preferably stored for service in a reservoir 32 under a nitrogen blanket.

Fluidization is achieved by a high rate of gas recycle to and through the bed, typically in the order of about 50 times the rate of feed of make-up gas. The fluidized bed has the general appearance of a dense mass of viable particles in possibly free-votex flow as created by the percolation of gas through the bed. The free flow of particles, and therefore fluidization, is substantiated by the fact that axial pressure drop through the bed is typically in the order of only about 1 psig.

Make-up gas is fed to the bed at a rate equal to the rate at which particulate polymer product is withdrawn. The composition of the make-up gas is determined by a gas analyzer 16 positioned above the bed. The gas analyzer determines component deficiency in the gas being recycled and the composition of the gas is adjusted accordingly to maintain as essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surface and compressor blades.

The recycle gas is then passed through a heat exchanger 26 wherein it is stripped of heat of reaction before it is returned to the bed. By constantly removing heat of reaction, no noticeable temperature gradient appears to exist within the bed. In particular, it has been observed that the bed acts to almost immediately adjust the temperature of the recycle gas to make it conform to the temperature of the bed thereby maintaining itself at an essentially constant temperature under steady state conditions. The recycle is then compressed in a compressor 28 and returned to the reactor at its base 18 and to the fluidized bed through distribution plate 20.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. Whatever its design, it must diffuse the recycle gas through the particles at the base of the bed to keep them viable, and also serve to support a quiescent bed of resin particles when the reactor is not in operation.

Hydrogen as a component of the gas stream is of equally significant utility in the vapor phase polymerization in the fluidized bed reactor as in more conventional systems. In vapor phase polymerization the melt index of the product is relatively insensitive to temperature in that a moderate change in operating temperature will not result in any significant change in melt index. Therefore, an alternate means to modify, where desired, melt index must be resorted to. It has been found that the melt index of the product increases as the hydrogen concentration in the gas stream is increased.

Also, if desired for pressure control of the system, any gas inert to the catalyst and reactants can be present.

It is essential to operate the fluid bed reactor at a temperature below the sintering temperature of the polymer particles. To insure that sintering will not occur, operating temperatures considerably below the sintering temperature are desired. For the production of ethylene homopolymers an operating temperature of from about 70° to about 110° C. is preferred, whereas an operating temperature of about 90° C. or lower is preferred for ethylene interpolymers.

The fluid bed reactor is preferably operated at a pressure of from about 40 to 300 psi or more, with operation at the intermediate and elevated pressures favoring heat transfer since an increase in pressure increases the unit volume heat capacity of the gas.

The catalyst is injected into the bed at a rate equal to its consumption at a point 30 which is above the distribution plate 20. Preferably, the catalyst is injected at a point located about ¼ to ¾ up the side of the bed. Injecting the catalyts at a point above the distribution plate is an important feature of the fluid bed polymerization procedure. Since the catalyst used in the practice of the invention are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

All or part of the make-up feed stream is used to carry the catalyst into the bed. It is preferred to use only part of the make-up feed stream as the carrier for the catalyst since at high productivities, the injection of a large amount of gas into the side of the bed may disrupt the characteristics of the bed and cause channeling or the like. As an alternative procedure, part of the recycle gas stream can be diverted for the purpose of carrying catalysts into the bed.

The productivity of the bed is solely determined by the rate of catalyst injection. The productivity of the bed may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards and downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a thermal analysis of the gas leaving the reactor is determinative of the rate of particulate polymer formation.

The particulate polymer product is preferably continuously withdrawn at a point 34 at or close to the dispersion plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to wait the next product recovery operation.

Finally, the fluidized bed reactor is equipped with an adequate venting system to allow venting the bed during start up and shut down.

The supported catalyst system of this invention appears to yield a fluid bed product having an average particle size between about 40 and 100 mesh wherein catalyst and carrier residue is unusually low.

The following Examples are designed to illustrate the present invention and are not intended as a limitation upon the scope thereof.

EXAMPLE 1

Bis(cyclopentadienyl)chromium [II] in heptane is added to an agitated slurry of dried intermediate density silica in isopentane. The resultant concentration was 6 grams of bis(cyclopentadienyl)chromium [II] per 100 grams of dried silica support. The silica had been dried at 800° C. in a stream of dry high-purity nitrogen. The mixture was allowed to agitate for one hour to allow the bis(cyclopentadienyl)chromium [II] to deposit on the support. At the end of the 1-hour period one-half of the slurry was withdrawn and used as a standard. Tetrahydrofuran (THF) was added to the remaining one-half of the slurry to yield a tetrahydrofuran to chromium ratio of 0.2. These two catalyst systems were then used in slurry polymerization reactions to prepare ethylene homopolymer resin for evaluation. The reactor was of standard pipe construction having a volume of about 50 gallons. Isopentane, ethylene, hydrogen, and catalyst were fed continuously to the reactor and the resultant polymer slurry containing unreacted ethylene and hydrogen was withdrawn continuously. A reaction temperature of 95° C. was maintained by an automatic control scheme and the application of a cooling medium to the jacket of the reactor. The rate of addition of the solvent, isopentane, was controlled at 50 pounds per hour, and the ethylene feed was maintained at 34 pounds per hour. Hydrogen was added to adjust the melt index of the resin to a target range of 12 ± 2, and the catalyst was added at a rate to give the desired polymerization rate. The polymer-isopentane slurry was discharged directly into a jacketed dryer where the isopentane was evaporated off along with the unreacted ethylene and hydrogen. The polyethylene resin was discharged from the dryer as an essentially dry powder. The powder was blended with 0.01 percent of an antioxidant and melt extruded in a 2½ inch twin-screw extruder to form pellets suitable for injection molding into the dishpans to be used for the impact strength tests. The results of the experiments were as shown as in Table I:

TABLE I

| Resin prepared with | Yield of Resin gm resin/gm catalyst | Resin Melt Index dg/min | Resin Density gm/cc | Resin Impact Str. ft-lbs. |
|---|---|---|---|---|
| catalyst without THF | 4100 | 11.4 | 0.960 | 7 |
| catalyst with THF | 4000 | 12.3 | 0.959 | 18 |

The antioxidant used was 2,6-ditertiary butyl-p-cresol. The test results show about a 160% increase in the impact strength of the resin without any significant decrease in yield or other resin properties when using the catalyst of the present invention.

EXAMPLE 2

A second set of experiments were conducted as in Example 1. The results are as shown as follows in Table II:

TABLE II

| Resin prepared with | THF/Cr mol ratio in catalyst | Yield of Resin gm resin/gm catalyst | Resin Melt Index dg/min | Resin Density gm/cc | Resin Impact Str. ft-lbs |
|---|---|---|---|---|---|
| catalyst without THF catalyst | 0.0 | 2600 | 11.0 | 0.959 | 17 |

TABLE II-continued

| Resin prepared with | THF/Cr mol ratio in catalyst | Yield of Resin gm resin/gm catalyst | Resin Melt Index dg/min | Resin Density gm/cc | Resin Impact Str. ft-lbs |
|---|---|---|---|---|---|
| with THF | 0.75 | 3450 | 13.6 | 0.959 | 26.5 |

These test results show about a 56% improvement in impact strength without an adverse effect on yield for the resins produced with the catalyst of the present invention. The support used was activated at 900° C.

EXAMPLE 3

A traverse of the THF/Cr mol ratio content of the catalyst was employed in a series of catalysts in polymerization reactions conducted as in Example 1, except that the polymerization temperature was held at about 85° C. The various polymers thus produced were recovered and evaluated as in Example 1. The results were as shown as follows in Table III:

TABLE III

| Run | THF/Cr mol ratio in catalyst | Yield of Resin gm resin/ gm catalyst | Resin Melt Index dg/min | Resin Flow Rate Ratio | Resin Density gm/cc | Resin Impact Strength Ft-lbs |
|---|---|---|---|---|---|---|
| A | 0.0 | 6750 | 16.4 | 31.5 | 0.966 | 10.8 |
| B | 0.75 | 10800 | 14.6 | 28.3 | 0.964 | 21.2 |
| C | 0.75 | 11400 | 12.2 | 29.4 | 0.963 | 21.2 |
| D | 1.5 | 8800 | 15.9 | 26.1 | 0.963 | 23.7 |
| E | 3.0 | 5600 | 14.6 | 26.9 | 0.965 | 21.2 |
| F | 6.0 | 6200 | 15.6 | 25.1 | 0.965 | 24.1 |
| G | 6.0 | 4000 | 19.6 | 24.8 | 0.964 | 19.6 |
| H | 6.0 | 9200 | 10.1 | 24.7 | 0.962 | 26.5 |

The test results show improvements of the order of about 81 to 145% in the impact strengths of the resins produced with the catalyst of the present invention without any significant decrease in the other physical properties of the resins. The yields obtained show that optimum results under slurry polymerization conditions are obtained at a THF/Cr mol ratio of about 0.75. The use of higher amounts of the tetrahydrofuran produces resins with improved impact strength, but not in the best yields. The fluctuations in yields in runs F, G and H are believed to have been caused by variations in the impurity level in the monomer feed. At the very high productivity levels achieved with these catalysts, very slight changes in impurity content in the monomer, i.e., of the order of <2-3 ppm., will cause dramatic changes in yields.

EXAMPLE 4

A series of three comparative runs were made under fluid bed polymerization conditions. The three catalysts for these runs were prepared by adding bis(cyclopentadienyl)chromium [II] as a solution in heptane to a slurry of dried silica in isopentane. The final concentration of the bis(cyclopentadienyl)chromium was 4 grams per 100 grams of silica in each catalyst. The silica used was MSID grade. The silica had been dried with high purity nitrogen gas at 900° C. before use. The slurry was agitated 1 hour to allow the bis(cyclopentadienyl)chromium [II] to deposit completely before the THF was added thereto, when THF was used in the catalyst. Following the addition of the THF to the catalyst, the isopentane was evaporated with stirring. The jacket of the reactor was heated to a temperature of about 45° C. Less than 1 hour was required to give a free flowing, essentially dry catalyst powder. The catalysts prepared in this manner were then used in a 14-inch diameter fluid bed reactor to produce ethylene homopolymer resin samples for evaluation. The reactor had a configuration of the device shown in the drawing, and was operated as disclosed above. Ethylene, hydrogen, and catalyst were added continuously while the resultant polymer was withdrawn intermittently. Traces of unreacted ethylene and hydrogen were withdrawn with the resin, both as gas dissolved in the polymer and as gas filling the voids between the particles. The polymerization temperature was controlled at 95° C. using a heat exchanger in the recycle gas stream. The recycle gas stream was maintained at about 4 $G_{mf}$ to provide good mixing and contacting in the bed. The total pressure in the reactor was 300 psig. The hydrogen to ethylene mol ratio in the reactor was 0.03 to 0.04, with the absolute level of ethylene being 79 to 94 volume % and that of hydrogen being 3 to 3.6 volume %, with the remainder being nitrogen. The polymer powder product was blended with 0.01 weight percent of the antioxidant of Example 1 and pelleted in a twin screw 2½ inch extruder for evaluation. The results of the experiments are shown in the following Table IV:

TABLE IV

| Run | THF/Cr mol ratio in catalyst | Yield gm resin/ gm catalyst | Resin Melt Index dg/min | Resin Flow Rate Ratio | Resin Density gm/cc | Resin Impact Strength fl-lbs |
|---|---|---|---|---|---|---|
| A | 0.0 | 2160 | 10.4 | 38 | 0.9623 | 10 |
| B | 1.1 | 1100 | 14.6 | 28 | 0.9610 | 14 |
| C | 1.7 | 2100 | 10.8 | 29 | 0.9600 | 23 |

The results show that resins having substantially improved impact strength may be prepared under fluid bed polymerization conditions with the catalysts of the present invention without necessarily experiencing a significant loss in yield or polymer properties.

EXAMPLES 5-32

A series of 28 ethylene homo- polymerization experiments were conducted and the results are reported herein as Examples 5 to 32. The polymerization reactions were conducted under slurry polymerization conditions. The catalysts used in these experiments were prepared, in general, as disclosed in Example 1, and the polymerization reactions were run, in general, as disclosed in Example 1. The supported catalyst was prepared by depositing 10 milligrams of bis(cyclopentadienyl)chromium [II] on a microspheroidal grade of silica support. The support had been activated at 760° C. in Examples 17 to 19, at 780° C. in Examples 5-6, 9-10 and 20-32, at 790° C. in Examples 7-8 and 11-13, and at 800° C. in Examples 14 to 16. 0.4 grams of the support were used in each of the Examples, except in Examples 7-8, and 11-16, wherein 0.25 grams of the support were used.

The polymerization reactions were conducted under slurry conditions in 500 ml of hexane for 30 minutes at 85° C. Thirty pounds per square inch (psi) of hydrogen gas was used in each reaction, and sufficient quantities of ethylene were used to raise the total pressure in the reaction system to 200 psi. for examples 7-8, and 11-16 and to 170 psi. in Examples 5-6, 9-10 and 17-32.

Various catalyst modifiers were used in the Examples to demonstrate that various types of modifiers falling within the broad class of modifiers disclosed above will provide the desired improved physical properties in the ethylene polymer products. The modifiers were used at various ratios of modifier to chromium containing compound. The results obtained with each modifier were compared with the results obtained in a control experiment wherein the catalyst preparation and the polymerization conditions were the same except that no modifier was added to the supported catalyst which was used in the control experiment.

The modifier and the amount thereof, where used, are listed below in Table V. Also listed in Table V is the yield of polymer which was obtained in each experiment as well as an indication of the melt index, and flow rate ratio properties of the resulting polymers. A review of this data indicates that the use of the modifiers of the present invention causes a decrease of the flow rate ratio of a polymer having a given melt index. This is an indication of a narrowing of the molecular weight distribution of the polymer, and this narrowing of the molecular weight distribution provides improvements in toughness and impact strength in articles molded from such polymers.

TABLE V-continued

| Ex. | Modifier Added | Mol Ratio, Modifier/Cr | Polymer Yield, g. | Polymer Properties MI | FRR |
|---|---|---|---|---|---|
| 19 | $(C_6H_5)_2O$ | 1.5 | 95 | 2.8 | 40 |
| 20 | None | 0 | 122 | 2.5 | 44 |
| 21 | $(C_6H_5)_2O$ | 0.5 | 131 | 2.6 | 40 |
| 22 | $(C_6H_5)_2O$ | 2 | 126 | 2.9 | 39 |
| 23 | None | 0 | 124 | 2.5 | 48 |
| 24 | p-dioxane | 0.5 | 70 | 2.8 | 40 |
| 25 | None | 0 | 86 | 4.0 | 41 |
| 26 | $(CH_3OCH_2)_2$ | 0.5 | 45 | 2.7 | 35 |
| 27 | None | 0 | 86 | 4.0 | 41 |
| 28 | $[(CH_3)_3Si]_2O$ | 0.5 | 112 | 5.8 | 37 |
| 29 | None | 0 | 124 | 2.5 | 48 |
| 30 | $C_2H_5OSi(CH_3)_3$ | 1 | 34 | 2.5 | 39 |
| 31 | None | 0 | 104 | 1.9 | 45 |
| 32 | $(CH_3HSiO)_4$ | 1 | 93 | 5.4 | 35 |

THF = tetrahydrofuran.
2-$CH_3$-THF = 2-methyltetrahydrofuran
THP = tetrahydropyran

EXAMPLES 33-43

A series of 11 experiments were conducted in which ethylene was interpolymerized with propylene in a 14 inch diameter fluid bed reactor as disclosed above with reference to the drawing. The catalysts used for the experiments were prepared as described in Example 4 above. The support used for each catalyst was MSID silica which had been activated at 800° C. The concentration of the organochromium compound used was 4 parts by weight of the chromium compound per 100 parts by weight of the support. Tetrahydrofuran (THF), in various amounts, was used as the catalyst modifier. The reactions were run for about 4 hours at 100°-102° C. at a total pressure of 300 psig. Various amounts of hydrogen and propylene were used with the ethylene in these reactions.

The various ratios of the reactants that were used in these experiments, as well as the yields (interms of catalyst productivity, i.e., pounds of polymer produced per pound of catalyst used) and properties of the resulting polymers, are listed below in Table V:

TABLE V

| Example | Ratio of THF/Cr | Ratio of propylene/ ethylene | Ratio of $H_2$/ ethylene | Prod. lb/lb | M.I. | FRR | Density |
|---|---|---|---|---|---|---|---|
| 33 | 9.1 | 0 | 0.022 | 2950 | 16.5 | 32.7 | 0.963 |
| 34 | 9.1 | 0.142 | 0.008 | 2950 | 13.0 | 23.0 | 0.956 |
| 35 | 9.1 | 0.245 | 0.005 | 3600 | 15.1 | 24.6 | 0.951 |
| 36 | 10.0 | 0.145 | 0.011 | 5050 | 16.2 | 29.6 | 0.956 |
| 37 | 10.0 | 0.152 | 0.020 | 4250 | 23.4 | 27.1 | 0.955 |
| 38 | 10.0 | 0.300 | 0.026 | 3600 | 38.6 | 27.3 | — |
| 39 | 10.0 | 0.292 | 0.038 | 3400 | 53.6 | 28.0 | 0.956 |
| 40 | 11.4 | 0.250 | 0.013 | 2950 | 14.6 | 26.5 | 0.956 |
| 41 | 11.4 | 0.141 | 0.009 | 2450 | 16.6 | 23.1 | 0.955 |
| 42 | 13.7 | 0.153 | 0.030 | 1850 | 15.5 | 32.2 | — |
| 43 | 13.7 | 0.245 | 0.006 | 1050 | 15.0 | 27.6 | 0.949 |

TABLE V

| Ex. | Modifier Added | Mol Ratio, Modifier/Cr | Polymer Yield, g. | Polymer Properties MI | FRR |
|---|---|---|---|---|---|
| 5 | None | 0 | 93 | 1.0 | 53 |
| 6 | THF | 0.5 | 77 | 1.3 | 39 |
| 7 | None | 0 | 105 | 9.4 | 36 |
| 8 | 2-$CH_3$-THF | 1.5 | 103 | 18.8 | 30 |
| 9 | None | 0 | 126 | 7.8 | 42 |
| 10 | THP | 0.5 | 117 | 4.7 | 35 |
| 11 | None | 0 | 105 | 11.5 | 40 |
| 12 | $(C_2H_5)_2O$ | 1 | 111 | 16.4 | 33 |
| 13 | $(C_2H_5)_2O$ | 4 | 108 | 20.1 | 31 |
| 14 | None | 0 | 71 | 4.3 | 50 |
| 15 | $(n-C_4H_9)_2O$ | 2 | 110 | 5.9 | 40 |
| 16 | $(n-C_4H_9)_2O$ | 6 | 34 | 4.2 | 41 |
| 17 | None | 0 | 107 | 3.7 | 45 |
| 18 | $(C_6H_5)_2O$ | 0.5 | 101 | 2.1 | 39 |

The data shown in Table V indicates that it is possible to vary the melt index of the polymers over a fairly wide range of values while maintaining the density and flow rate ratio values fairly constant. The yields tend to be adversely effected when THF is used in excess of about 12 moles of THF per mole of the chromium compound.

The bis(cyclopentadienyl)chromium [II] compound which was used in all the examples was an unsubstituted compound, i.e., the compound in which n' and n'' as defined above, are each 0.

The yields of ethylene polymer obtained in the examples disclosed above, as well as the reported impact strength and flow rate ratio values for such polymers, indicate that, if desired, improvements in the impact strength, i.e., increased impact strength values, can be obtained with the modified catalyst of the present invention without any adverse effect at all on the productivity of the catalyst. That is, there is no significant decrease in the amount of polymer that can be made per unit weight of chromium metal in the modified catalyst as compared to the amount of polymer that can be made with the same unit weight of chromium metal in the unmodified catalyst. In some cases the yield of polymer can be increased by the use of the modified catalyst of the present invention, as compared to the yield obtained by the unmodified catalyst, while also obtaining improved impact strength properties for the polymer.

The Examples disclosed above also indicate that, in some cases, and particularly where they are used in relatively large amounts, the use of the modifiers in the catalysts of the present invention may lead to the production of lesser amounts of polymer than might otherwise be obtained by the use of the unmodified catalyst. Such lower productivities, however, would not necessarily be so adverse, from a practical or commercial point of view, as to preclude the use of the thus modified catalyst in a commercial enterprise. Because of the fact that the productivity of the unmodified supported bis(cyclopentadienyl)chromium [II] catalysts is so high, and the cost of using the catalyst is, therefore, so relatively low, a commercial producer of ethylene polymers who uses the supported bis(cyclopentadienyl)chromium [II] catalysts would be willing, in many instances, to sacrifice some productivity in favor of readily making lesser amounts of ethylene polymer having desired flow ratio properties and improved impact strength properties. The amount of productivity that the producer would be willing to sacrifice could vary from > 0 to up to about 50% of the productivity of the unmodified catalyst, depending on the amount and/or value of the ethylene polymer product which is desired.

Further, a commercial producer of ethylene polymer who uses bis(cyclopentadienyl)chromium [II] catalyst would also be willing to sacrifice some productivity in order to obtain ethylene polymers having improved impact strength by being able to readily modify this existing catalyst at will, rather than having to expend the time, effort and/or resources needed to acquire an entirely different catalyst to perform the same function.

What is claimed is:

1. In a process for polymerizing a monomer charge comprising ethylene by contacting said charge with activated inorganic oxide supported bis(cyclopentadienyl) chromium [II] catalyst
    wherein said inorganic oxide is selected from the group consisting of silica, alumina, thoria, zirconia and mixtures thereof, and the bis(cyclopentadienyl) chromium [II] compound has the structure

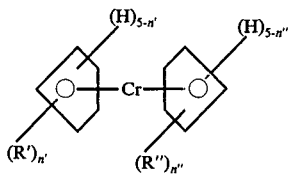

wherein $n'$ and $n''$ are each integers of 0 to 5, inclusive, and R' and R'' are each $C_1$ to $C_{20}$, inclusive, hydrocarbon radicals, the improvement which comprises modifying said catalyst prior to said contact with said monomer charge by contacting said catalyst with, per mol of the organo-chromium compound, 0.01 to 20 mols of at least one modifying compound having in its structure at least one moiety of the formula

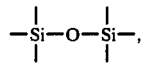

said modifying compound being devoid of OH, SH, $NH_2$, COOH, halogen, alkoxy and aryloxy radicals in such amounts as would poison the polymerization system under the prevailing reaction conditions, and
    said modifying with said modifying compound providing a modified catalyst with which, in comparison to the use of the unmodified catalyst in said polymerization process, polymers of improved impact strength are prepared.

2. A process as in claim 1 wherein the modifier comprises a disiloxane.

3. A process as in claim 2 wherein the disiloxane comprises an organodisiloxane.

4. A process as in claim 3 wherein said organodisiloxane comprises hexamethyl disiloxane.

5. A process as in claim 1 wherein the modifier comprises a cyclic organosiloxane.

6. A process as in claim 5 wherein said cyclic organosiloxane comprises a tetramethylcyclotetrasiloxane.

7. A process as in claim 1 in which said monomer charge consists of ethylene.

8. A process as in claim 1 in which said monomer charge comprises ethylene and at least one α-olefin containing 3 to about 12 carbon atoms.

9. A process as in claim 8 in which said monomer charge comprises ethylene and propylene.

10. A process as in claim 1 in which about 0.05 to 12 mols of modifier are used per mole of the organo-chromium compound.

11. A process as in claim 1 in which said support is silica.

12. A process as in claim 7 in which said support is silica.

13. A process as in claim 8 in which said support is silica.

14. An olefin polymerization catalyst which comprises bis(cyclopentadienyl) chromium [II] compound of the structure

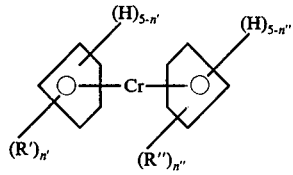

wherein $n'$ and $n''$ are each integers of 0 to 5, inclusive, and R' and R'' are each $C_1$ to $C_{20}$, inclusive, hydrocarbon radicals,
    supported on activated inorganic oxide having a surface area of about 50 to 1000 square meters per gram and selected from the group consisting of silica, alumina, thoria, zirconia and mixtures thereof, and modified by being contacted with, per mol of the organochromium compound, 0.01 to 20 mols of at least one modifying compound having in its structure at least one moiety of the formula

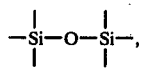

said modifying compound being devoid of OH, SH, NH$_2$, COOH, halogen, alkoxy and aryloxy radicals in such amounts as would poison the polymerization system under the prevailing reaction conditions, and said modifying compound being adapted to so modify the unmodified catalyst by said modifying that the modified catalyst is adapted to provide, in comparison to the use of the unmodified catalyst for olefin polymerization purposes, polymers of improved impact strength.

15. A catalyst as in claim 14 wherein the support comprises silica.

16. A catalyst as in claim 15 wherein about 0.05 to 12 mols of modifier are used per mol of the organochromium compound.

17. A catalyst as in claim 16 wherein the modifier comprises a disiloxane.

18. A catalyst as in claim 17 wherein the disiloxane comprises an organodisiloxane.

19. A catalyst as in claim 18 in which said organodisiloxane comprises hexamethyl disiloxane.

20. A catalyst as in claim 16 wherein the modifier comprises a cyclic organosiloxane.

21. A catalyst as in claim 20 in which said cyclic organosiloxane comprises tetramethylcyclotetrasiloxane.

22. A process for improving the properties, as an ethylene polymerization catalyst, of activated inorganic oxide supported bis(cyclopentadienyl) chromium [II] compound, wherein the inorganic oxide has a surface area of about 50 to 100 square meters per gram and is selected from the group consisting of silica, alumina, thoria, zirconia and mixtures thereof, and the bis(cyclopentadienyl) chromium [II] compound has the structure

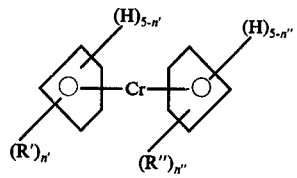

wherein $n'$ and $n''$ are each integers of 0 to 5, inclusive, and R' and R" are each C$_1$ to C$_{20}$, inclusive, hydrocarbon radicals, which comprises modifying the supported bis(cyclopentadienyl) chromium [II] compound by contacting it with 0.01 to 20 mols of siloxane compound per mol of said bis(cyclopentadienyl) chromium [II] compound, said siloxane compound being devoid of OH, SH, NH$_2$, COOH, halogen, alkoxy and aryloxy radicals in such amounts as would poison the polymerization reaction under the prevailing conditions, and said siloxane compound being adapted to so modify the unmodified catalyst by said modifying that the modified catalyst is adapted to provide, in comparison to the use of the unmodified catalyst for olefin polymerization purposes, polymers of improved impact strength.

23. A process as in claim 22 in which said siloxane compound comprises a disiloxane.

24. A process as in claim 1 which is conducted under slurry conditions.

25. A process as in claim 1 which is conducted in a fluid bed reactor.

* * * * *

UNITED STATES PATENT OFFICE
CERTIFICATE OF CORRECTION

Patent No. 4,086,409         Dated  April 25, 1978

Inventor(s)  F. J. Karol et al.

It is certified that error appears in the above-identified patent and that said Letters Patent are hereby corrected as shown below:

Column 1, line 12, "075,456" should read -- 075,457 --.
Column 1, line 59, the equation should read
-- $\frac{6+6+7+8+8}{5} \times 2 = 14$ foot pounds --

Column 3, line 50 in "Ro", both occurrences, the "o" should be the same size.
Column 3, line 50 "radicaL" should read -- radical --.
Column 12, line 66, "cayalyst" should read -- catalysts --.

Column 18, line 37, "interms" should read -- in terms --.

Signed and Sealed this

Seventeenth Day of April 1979

[SEAL]

Attest:

RUTH C. MASON
*Attesting Officer*

DONALD W. BANNER
*Commissioner of Patents and Trademarks*